United States Patent
Stewart et al.

[19]

[11] Patent Number: 5,866,827
[45] Date of Patent: Feb. 2, 1999

[54] AUTO-ORIENTING MOTION SENSING DEVICE

[75] Inventors: Robert R. Stewart; Malcolm B. Bertram; Eric V. Gallant, all of Calgary, Canada

[73] Assignee: University Technologies International Inc., Calgary, Canada

[21] Appl. No.: 742,156

[22] Filed: Oct. 31, 1996

[51] Int. Cl.⁶ ...................................................... G01V 1/16
[52] U.S. Cl. ................................................ 73/784; 73/652
[58] Field of Search ............................. 340/690; 73/652, 73/654, 784; 181/112, 122; 367/188, 173

[56] References Cited

U.S. PATENT DOCUMENTS

| | | | |
|---|---|---|---|
| 4,109,757 | 8/1978 | Hebberd | 181/112 |
| 4,767,208 | 8/1988 | Cain | 356/138 |
| 5,142,497 | 8/1992 | Warrow | 367/173 |
| 5,231,252 | 7/1993 | Sasone | 181/112 |

*Primary Examiner*—Christine K. Oda
*Attorney, Agent, or Firm*—Anthony R. Lambert

[57] ABSTRACT

A self-orienting motion sensor in which an inner housing, preferably spherical, is free to rotate within a cavity, also preferably spherical, resting on a support in an outer housing. The inner housing has a preferred orientation due to the center of gravity being lower than the rotational center of the inner housing. Motion sensing elements are arranged within the inner housing to measure at least one and preferably three directions of motion. A signal transfer mechanism transfers signals to a recorder. The motion of the inner housing may be limited in a pre-determined range, the inner housing may include a magnet to orient it in a defined relation to the earth's magnetic field and the housing may be provided with ground engaging devices to fix the housing in the ground.

19 Claims, 1 Drawing Sheet ically or in conjunction with the fluid. For example, ball
AUTO-ORIENTING MOTION SENSING DEVICE

FIELD OF THE INVENTION

This invention relates to motion sensors, and particularly to geophones.

CLAIM TO COPYRIGHT

Not applicable

CROSS-REFERENCE TO OTHER APPLICATIONS

Not applicable

REFERENCE TO MICROFICHE APPENDIX

Not applicable

BACKGROUND OF THE INVENTION

Motion sensors are commonly fixed, but it is preferred, particularly for three component geophones, that one motion sensing element be vertical and the orientation of the other motion sensing elements known. In practice, geophones have spikes which are forced into the ground or allowed to lie on the ground at various angles. Measurements made with such geophones are less accurate than measurements made with geophones which are level with motion sensing elements oriented in a known direction. There has therefore been proposed a self-orienting geophone in which the motion sensing devices are held in a gimbal arrangement. This arrangement is somewhat complex and tends to be large, and it is believed that there is a need for a simpler self-orienting geophone with a different response to ground motion.

SUMMARY OF THE INVENTION

In accordance with a first aspect of the invention, there is provided a self-orienting motion sensor in which an inner housing, preferably spherical, is free to rotate within a cavity, also preferably spherical, in an outer housing. The inner housing has a preferred orientation due to the center of gravity being lower than the rotational center of the inner housing. Motion sensing elements are arranged within the inner housing to measure at least one and preferably three directions of motion. A signal transfer mechanism transfers signals to a recorder.

In accordance with further aspects of the invention, the motion of the inner housing may be limited in a pre-determined range, the inner housing may include a magnet to orient it in a defined relation to the earth's magnetic field and the housing may be provided with ground engaging devices to fix the housing in the ground.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which the FIGURE is a schematic of an embodiment of the invention.

DETAILED DESCRIPTION OF PREFERRED EMBODIMENTS

Figure 1:
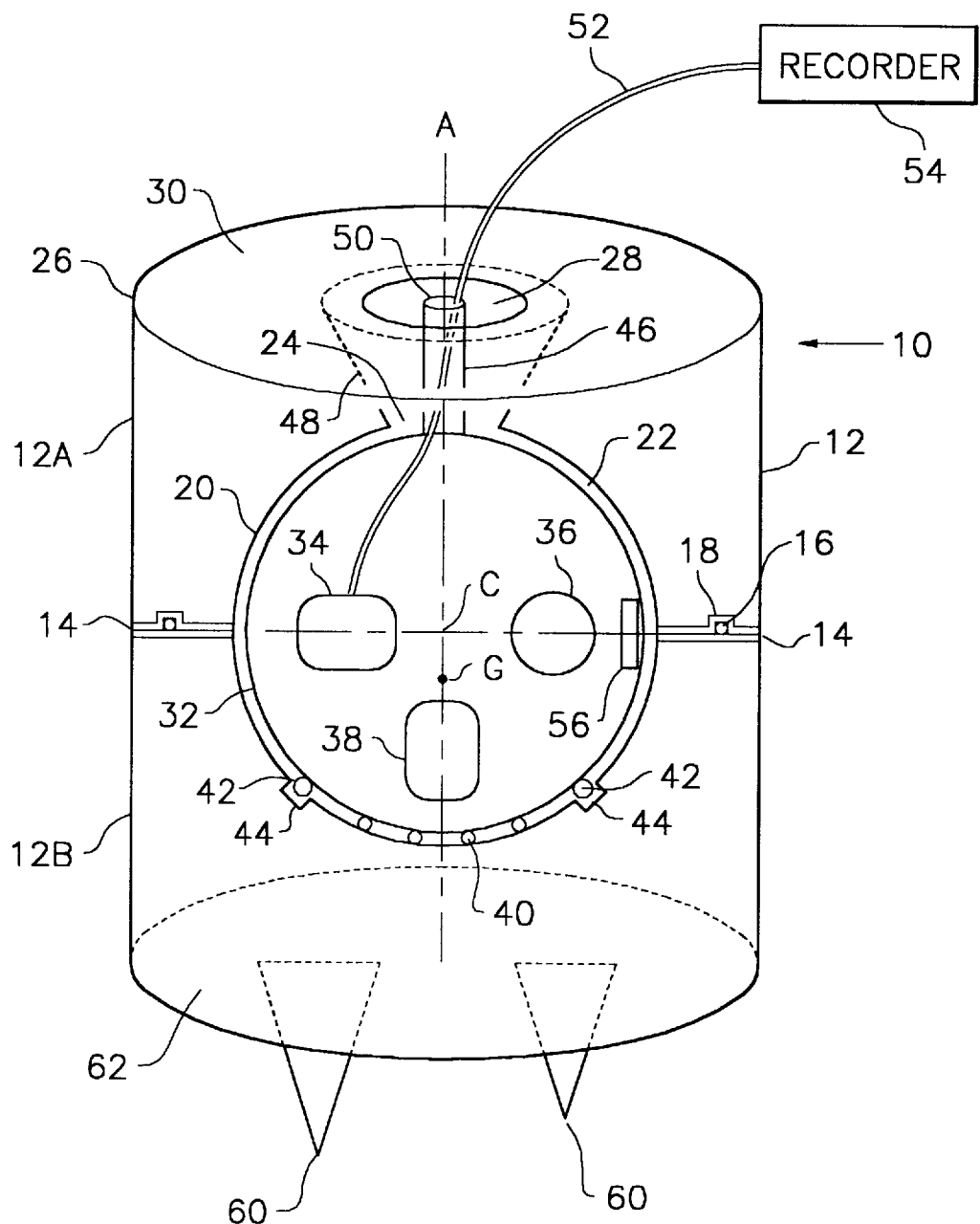

Referring to the FIGURE, self-orienting motion sensing device 10 has a cylindrical outer housing 12 formed of upper and lower sections 12a and 12b fitted together with annular rib 14 and seal 16 seated in annular groove 18. The outer housing 12 has a spherical inner wall 20 defining a spherical inner cavity 22. An opening 24 in the inner wall 20 at an upper end 26 of the outer housing 12 extends through to an opening 28 in upper end wall 30 of the outer housing 12.

A spherical inner housing 32 is supported without a fixed connection for rotation within the inner cavity 22 and translation of forces from the outer housing 12 to the inner housing 32. The inner housing 32 is preferably concentric with the inner wall 20, and the difference in their diameters defines twice the gap size when the inner housing 32 is centrally located in the inner cavity 22. Various methods may be used to support the inner housing 32 so that forces are translated to the inner housing from the outer housing 12 without a fixed link between the inner housing and the outer housing. For example, the inner housing 32 may float in fluid, such as water or oil, in the inner cavity 22. To ensure translation of shear forces across the gap between the inner housing 22 and the inner wall 20 in the case of using a fluid for support, the gap should be small in relation to the wavelength of the shortest wave in the bandwidth for which the motion sensing device 10 is designed. In the case where the motion sensor is a geophone used in seismic exploration, a gap of about 1 mm is believed to be adequate. Other methods may be used to support the inner housing 22, separately or in conjunction with the fluid. For example, ball bearings 40 may be dropped in the inner cavity 22 and allowed to roam freely within the gap between the inner wall 20 and inner housing 32. A suitable barrier, not shown, should be used to prevent the ball bearings 40 from falling out of the gap in case the outer housing 12 is turned upside down. As a further example of a support for the inner housing 32, bearings 42 seated in races 44 or rollers (not shown) in the inner wall 20 may be used. Direct mechanical contact of the inner housing 32 with the outer housing 12 is advantageous in that it can be assured that shear and compressional waves are translated into the inner housing 32. In these cases, it will be seen that the inner housing 32 rests on the outer housing 12 under gravitational forces, and is not directly linked to the outer housing 12.

The inner housing 32 has fixed within it at least one and preferably three orthogonal motion sensors 34, 36, 38, such as accelerometers or geophones. For example, in the case where the auto-orienting motion sensing device 10 is oriented such that the axis A of the outer housing 12 is vertical, motion sensors 34 and 36 may detect horizontal motion in two orthogonal directions, and motion sensor 38 may detect vertical motion. Other configurations of motion sensors 34, 36 and 38 are possible, such as Gal'perin or pyramidal, as well known in the art. The inner housing 12 has a center of rotation C and a center of gravity G, which depends on the distribution of mass in the inner housing 12. The center of gravity G of the inner housing must be offset from the center of rotation C to an extent such that gravitational forces are sufficient to rotate the inner housing 12 to a stable position. The preferred stable position in the embodiment shown is such that the motion sensor 38 is vertically aligned, regardless of whether the axis A of the outer housing 12 is vertically aligned. The motion sensors 34, 36, 38 should be so attached to the inner housing 32 that they move with the inner housing.

It may be advantageous in some situations to prevent free rotation of the inner housing 32 and for this purpose means may be supplied to limit rotational movement of the inner housing 32, for example to within 20 degrees of axis A. In the example shown, an arm 46 is connected to the inner housing 32 and extends into the opening 24. The arm 46 is limited in movement due to the edge 48 of the opening 24. The end wall 30 of the outer housing may be provided with an opening 28 so that the end 50 of the arm 46 is visible. This provides a visible level indicator, so that it may be easily checked that the self-orienting mechanism is working.

Wires 52 leading to each of the motion sensors may be provided to transfer signals from the motion sensors 34, 36, 38 to a conventional recorder 54. Other mechanisms may be used to transfer signals to the recorder. For example, the motion sensors 34, 36, 38 may be equipped with transmitters, and the recorder equipped with a receiver. In a further example, the signals could be connected through conducting roller contacts, such as selected ones of the bearings 42, or brushes, not shown, on the sides of the inner housing 32 or inner wall 20. Alternatively, optical, acoustic or inductive or other signal transfer mechanisms may be used.

If desired, a magnet 56 may be located in the inner housing 32 and used to orient the inner housing 32 to magnetic north or to a defined position within the housing 12. The magnet 56 may be installed with one of the motion sensors 34, 36, 38. It may be a permanent magnet, or may be an electromagnet or geophone used as an electromagnet supplied with electricity through conductors, not shown, passing through the arm 46. The geophone may be powered in one time segment from power from the recorder to orient the inner housing and the geophone, then allowed to act passively as a motion sensor in a second time segment. This sequence of time segments may then be repeated as required.

The auto-orienting motion sensing device 10 may be used on surfaces in situ or in marine environments. In the case of use on surfaces, particularly where the auto-orienting motion sensing device 10 is moved repeatedly from one location to another, ground engaging contacts such as spikes 60 may be fastened or formed on one ground engaging end 62 of the housing 12 opposed to the end 26. One, two or three spikes 60 may be used as desired.

The inner housing 32 is preferably free to rotate about three orthogonal axes, but may be constrained to rotate only to the vertical. In that instance, the inner housing 32 could be cylindrical, but this is not preferred.

The inner housing is shown in its preferred form as a sphere, but could be hemi-spherical (only the lower half), cylindrical in which case levelling is obtained about one axis only, or semi-cylindrical or other shape that may rotate within the outer housing 12 and effectively float freely within the constraints of the support mechanism within the inner cavity.

In the case of the fluid support, the coupling of the inner housing to the outer housing is over a wide area. For bearing supports, coupling can be provided over a wide area with many bearings, or a restricted area as for example with a minimum of three bearings disposed at the same level in the inner wall at 120° to each other.

A person skilled in the art could make immaterial modifications to the invention described in this patent document without departing from the essence of the invention that is intended to be covered by the scope of the claims that follow.

The embodiments of the invention in which exclusive property or privilege is claimed are defined as follows:

1. A self-orienting motion sensing device, comprising:
   an outer housing having an inner cavity;
   an inner housing disconnected from the outer housing and supported for rotation about at least one axis within the inner cavity and for translation of shear and compressional forces from the outer housing to the inner housing;
   the inner housing having a center of rotation and a center of gravity offset from the center of rotation to an extent such that gravitational forces are sufficient to rotate the inner housing to a stable position;
   a first motion sensor fixed within the inner housing for movement with the inner housing; and
   a signal transfer mechanism for sending signals from the first motion sensor to a recorder.

2. The self-orienting motion sensing device of claim 1 further comprising means extending between the inner housing and outer housing for limiting rotational movement of the inner housing.

3. The self-orienting motion sensing device of claim 1 in which:
   the inner cavity and the inner housing are each spherical; and
   the inner housing is free to rotate about three orthogonal axes.

4. The self-orienting motion sensing device of claim 3 further comprising means extending between the inner housing and outer housing for limiting rotational movement of the inner housing.

5. The self-orienting motion sensing device of claim 4 in which the means for limiting rotational movement comprises:
   an opening in the outer housing at one side of the inner cavity; and
   an arm extending from the inner housing into the opening.

6. The self-orienting motion sensing device of claim 5 in which the signal transfer mechanism comprises conductors connected to the first motion sensor and extending through the arm.

7. The self-orienting motion sensing device of claim 3 further including second and third motion sensors fixed within the inner housing and each oriented orthogonally to the first motion sensor.

8. The self-orienting motion sensing device of claim 5 in which the outer housing has a ground engaging end and means at the ground engaging end for positioning the outer housing on the ground.

9. The self-orienting motion sensing device of claim 8 in which the outer housing has an upper end opposed to the ground engaging end, the opening being at the upper end.

10. The self-orienting motion sensing device of claim 3 further comprising a magnet disposed within the inner housing for aligning the inner housing within a magnetic field.

11. The self-orienting motion sensing device of claim 10 in which the magnet is an electro-magnet powered through conductors leading into the inner housing through an opening in the outer housing.

12. The self-orienting motion sensing device of claim 3 in which the inner housing is supported on a fluid bearing.

13. The self-orienting motion sensing device of claim 12 in which the inner housing is concentrically disposed within the outer housing.

14. The self-orienting motion sensing device of claim 3 in which the inner housing is supported on ball bearings.

15. The self-orienting motion sensing device of claim 13 in which the inner housing is spaced from the outer housing by less than 1 mm.

16. The self-orienting motion sensing device of claim 12 in which the inner housing is spaced from the outer housing by less than 1 mm.

17. A self-orienting motion sensing device, comprising:
    an outer housing having an inner cavity;

an inner housing disconnected from the outer housing and supported for rotation about at least one axis within the inner cavity and for translation of forces from the outer housing to the inner housing;

the inner housing having a center of rotation and a center of gravity offset from the center of rotation to an extent such that gravitational forces are sufficient to rotate the inner housing to a stable position;

a first motion sensor fixed within the inner housing for movement with the inner housing;

a signal transfer mechanism for sending signals from the first motion sensor to a recorder; and means extending between the inner housing and outer housing for limiting rotational movement of the inner housing.

18. The self-orienting motion sensing device of claim 17 in which:

the inner cavity and the inner housing are each spherical;

the inner housing is free to rotate about three orthogonal axes; and the means for limiting rotational movement comprises:

an opening in the outer housing at one side of the inner cavity; and an arm extending from the inner housing into the opening.

19. The self-orienting motion sensing device of claim 18 in which the signal transfer mechanism comprises conductors connected to the first motion sensor and extending through the arm.

* * * * *

UNITED STATES PATENT AND TRADEMARK OFFICE
CERTIFICATE OF CORRECTION

PATENT NO.    : 5,866,827
DATED         : February 2, 1999
INVENTOR(S)   : Robert R. Stewart et al.

It is certified that error appears in the above-identified patent and that said Letters Patent is hereby corrected as shown below:

<u>Title page,</u>
Item [56], please add the following references aknowledged by the Examiner, but not appearing in the References Cited.

-- Mark Products, A Division of Shaw Resource Service, Inc., G-210 Gimbal Mounted, High Performance Geophone, brochure.

Western Atlas International, A Litton/Dresser Company, LRS-1025 High-Temperature 2-D Gimbal Geophone, brochure, 1989.

Abstract of U.S. Patent No. 5,335,208, Sansone, August 2, 1994.

Release entitled "NETCO, LLC Principal Granted Third Patent On New Seismic Signal Technology", dated November 25, 1996. --

Signed and Sealed this

Twenty-second Day of January, 2002

Attest:

JAMES E. ROGAN
*Attesting Officer*   *Director of the United States Patent and Trademark Office*